Jan. 4, 1966    R. C. PARK ETAL    3,227,037
GLASS ARTICLE INSPECTING
Filed July 18, 1962
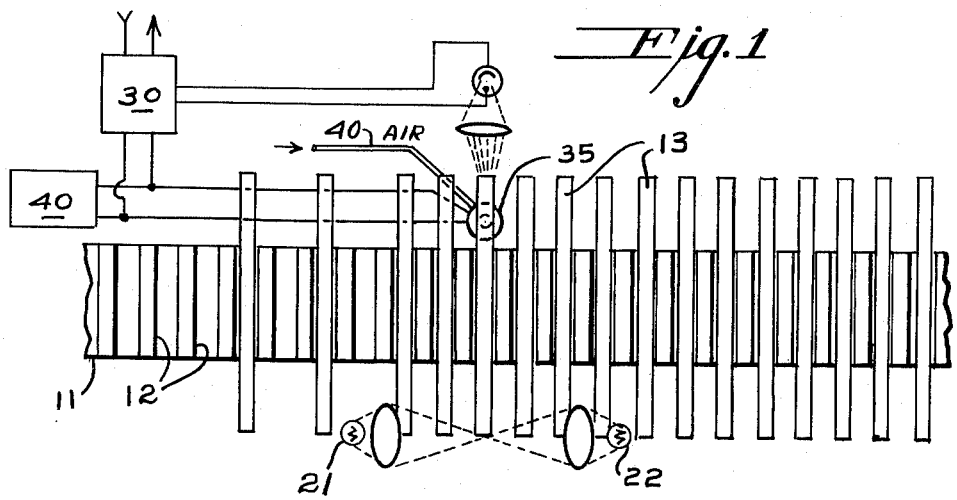
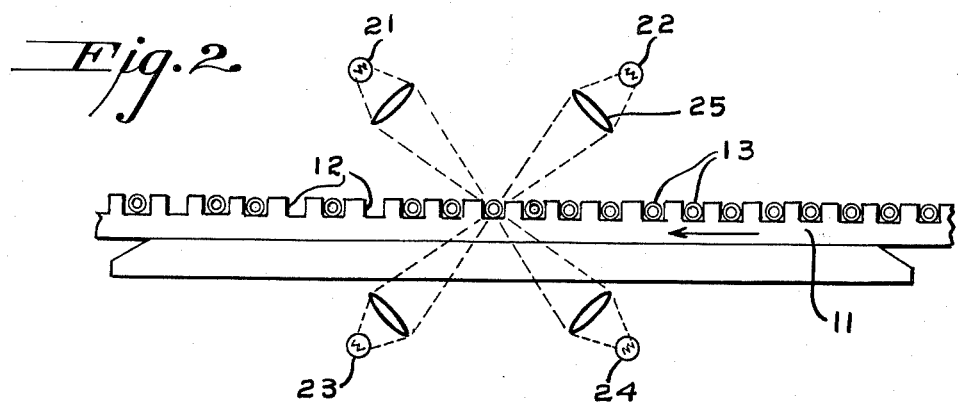
INVENTORS
RONALD C. PARK AND
ARTHUR H. WILDER
By Clarence R. Catty, Jr.
ATTORNEY

United States Patent Office 3,227,037
Patented Jan. 4, 1966

3,227,037
GLASS ARTICLE INSPECTING
Ronald C. Park and Arthur H. Wilder, Painted Post, N.Y., assignors to Corning Glass Works, Corning, N.Y., a corporation of New York
Filed July 18, 1962, Ser. No. 210,735
6 Claims. (Cl. 88—14)

The present invention relates to methods of and apparatus for automatically inspecting pieces of light transmitting material having end configurations that vary from those having end faces at right angles to their center line.

Applicants have discovered that if a beam of light is focused toward the end of such a piece of material from a source at right angles to the center line of its end face and such face is in a plane normal to its center line and free of surface imperfections, no light rays will be trapped therein and no energy will be emitted from its other end face. On the other hand, if such one end face of the piece contains one or more irregularities, these will cause some of the light rays to be trapped in the body thereof and emitted from its other end face, and may be utilized to control the removal of such piece from a group thereof containing pieces meeting required standards. Applicants have also discovered that the efficaciousness of the method may be improved either by rotation of the piece about its end face center or, preferably, by focusing beams from a plurality of light sources toward such one end of the piece spaced in a circle radially disposed with respect to the end of the body whose face is to be inspected.

According to a preferred embodiment of invention, as applied for example to the inspection of glass rod or tube elements and similar articles, facilities are provided for their conveyance over a predetermined path to a delivery position as by a conveyor belt, which may present the elements for inspection at speeds attaining 4000 elements per minute. Along such path, light sources spaced from one another are arranged at locations at right angles to the centers of the elements and arranged to focus beams that converge upon one end of each element as it passes through the focal center of such beams. A photocell is arranged to intercept any light from such sources that is emitted from an element, and upon receipt of an impulse of light, as the piece passes through the light beams in an amount indicative of an unacceptable element, an amplifier under control of such photocell effects the immediate monetary operation of a device that removes the element from the conveyor. If desired, a pen recorder may also be operated in parallel with such device to make a permanent record of the range of variance of the end face configurations of the articles, and to facilitate adjustment of the device.

For a more comprehensive understanding of the invention, reference is now made to the accompanying drawing wherein FIG. 1 is a diagrammatic plan view of a fragment of a conveyor, transversely of which are arranged linear bodies one of whose ends is to be inspected, and having apparatus embodying the invention associated therewith.

FIG. 2 is a side elevational view of the same.

Referring to the drawing in detail, there is depicted a conventional form of endless conveyor 11 provided with transverse channels such as 12 for the conveyance of glass tubes such as 13 toward a delivery position in a conventional fashion. Alongside the path of travel of tubes 13 are located light sources 21, 22, 23 and 24, respectively, which through the medium of suitable converging lenses, such as 25, focus beams of light along paths normal to the axes of the tubes into an end region of each as it intercepts the light beams from sources 21–24. As will be understood, one such light source will suffice if provision is made to rotate the tube about its axis while intercepting light from such one source to enable it to scan the entire periphery of the tube. The need for such scanning is, however, preferably obviated by employment of a plurality of light sources such as shown.

If the scanned tube end is in a plane normal to its end face and free of flaws, substantially no light will be trapped in the glass and no energy will be emitted from its other end. On the other hand, if such scanned end is irregular, the intercepted light will be caught inside the glass and will be reflected a number of times and emitted as a light pulse from the other end face of the tube. Opposite such other end face of the tube, a photocell is provided to pick up this pulse of light energy and feed a proportioned amount of electric energy to an amplifier 30 which in turn will feed the amplified electrical energy to a pen recorder 40 to establish a record of the range of the variations and through a magnetically operable valve 35 to momentarily open it, when the end configuration of a tube varies from normal an excessive amount, to direct a pulse of air from a supply line 40 toward the underside of the tube to eject it from conveyor 11.

What is claimed is:

1. A method for detecting irregularities in a generally plane first surface of a transparent body which body is elongated in a direction perpendicular to said first surface, which method comprises directing light across said first surface in a direction substantially parallel to said first surface to cause rays of said light to enter said irregularities in said first surface and to be transmitted by internal reflection within said elongated transparent body and to emerge from a second surface of said body remote from said first surface, and detecting the light emerging from said second surface as an indication of said irregularities.

2. The method according to claim 1 which includes rotating said body in a direction parallel to said generally plane first surface, while directing said light beam thereacross.

3. The method according to claim 1 which includes directing a plurality of light beams across said first surface in a plurality of directions generally parallel to said first surface.

4. The method for detecting irregularities in an end surface of a piece of glass tubing which comprises directing light across said end surface in a direction substantially parallel to said end surface to cause rays of said light to enter said irregularities in said end surface and to be transmitted by internal reflection within the body of said tubing and to emerge from the remaining end of said tubing, and detecting the light emerging from the said remaining end of said tubing as an indication of said irregularities.

5. The method according to claim 4 which includes directing a plurality of light beams across said end surface in a plurality of directions substantially parallel to said end surface.

6. The method for detecting irregularities in an end surface of a piece of glass tubing, said end surface being substantially perpendicular to the axis of said tubing, which comprises directing light across said end surface in a direction substantially parallel to said end surface while rotating said tubing about its axis to cause rays of said light to enter said irregularities in said end surface and to be transmitted by internal reflection within the body of said tubing and to emerge from the remaining end of said tubing, and detecting the light emerging from the said remaining end of said tubing as an indication of said irregularities.

References Cited by the Examiner

UNITED STATES PATENTS

| | | | |
|---|---|---|---|
| 2,750,519 | 6/1956 | Summerhayes | 209—111.5 X |
| 2,944,667 | 7/1960 | Stevens | 209—111.5 |
| 3,034,645 | 5/1962 | Groppe | 209—111.5 |

FOREIGN PATENTS

| | | |
|---|---|---|
| 793,282 | 4/1958 | Great Britain. |

ROBERT B. REEVES, *Primary Examiner.*